(12) United States Patent
Stevenson et al.

(10) Patent No.: US 9,996,618 B2
(45) Date of Patent: Jun. 12, 2018

(54) LOCATING RELEVANT CONTENT ITEMS ACROSS MULTIPLE DISPARATE CONTENT SOURCES

(71) Applicant: Microsoft Technology Licensing, LLC, Redmond, WA (US)

(72) Inventors: Bradley Stevenson, Seattle, WA (US); Adam David Harmetz, Seattle, WA (US); Quentin Gary Christensen, Redmond, WA (US); Julian Zbogar Smith, Redmond, WA (US); Anupama Janardhan, Seattle, WA (US); Carlos David Argott Hernandez, Bellevue, WA (US); Ramanathan Somasundaram, Bothell, WA (US); Benjamin Joseph Rinaca, Seattle, WA (US); Fan Mao, Redmond, WA (US); Graham Lee McMynn, Redmond, WA (US); Jessica Anne Alspaugh, Seattle, WA (US); Michal Piaseczny, Issaquah, WA (US); Tudor Baraboi, Seattle, WA (US); Ashish Shrikrishna Malgi, Redmond, WA (US); Thottam R. Sriram, Redmond, WA (US); Zainal Arifin, Redmond, WA (US); John D. Fan, Redmond, WA (US); Kameshwar Jayaraman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/201,124

(22) Filed: Jul. 1, 2016

(65) Prior Publication Data
US 2017/0032039 A1     Feb. 2, 2017

Related U.S. Application Data

(63) Continuation of application No. 13/295,108, filed on Nov. 14, 2011, now Pat. No. 9,817,898.

(51) Int. Cl.
*G06F 7/00*     (2006.01)
*G06F 17/30*     (2006.01)

(52) U.S. Cl.
CPC ............................ *G06F 17/30864* (2013.01)

(58) Field of Classification Search
CPC ...... G06F 7/00; G06F 17/30; G06F 17/30864; G06F 17/2818; G06F 17/2854; G06F 17/30595
See application file for complete search history.

(56) References Cited

U.S. PATENT DOCUMENTS

| 5,826,260 A | 10/1998 | Byrd, Jr. et al. |
| 6,122,666 A | 9/2000 | Beurket et al. |

(Continued)

FOREIGN PATENT DOCUMENTS

| CN | 1374606 A | 10/2002 |
| CN | 1511283 A | 7/2004 |

(Continued)

OTHER PUBLICATIONS

"IBM eDiscovery Manager Version 2.2—Installing and Configuring your eDiscovery Management System", Retrieved from <<http://publibfp.dhe.ibm.com/epubs/pdf/c1912783.pdf>>, Dec. 7, 2010, 84 Pages.

(Continued)

*Primary Examiner* — Azam Cheema
(74) *Attorney, Agent, or Firm* — Merchant & Gould P.C.

(57) ABSTRACT

Technologies are described herein for locating relevant content items across multiple disparate content sources. Query parameters are received from a user interface for defining a query for searching a number of content sources located on multiple, disparate content servers. A native search is executed on each of the content servers based on the received query parameters, and query statistics and other (Continued)

data regarding content items in the content sources matching the query parameters are received. The query statistics are aggregated across the content servers and presented in the user interface. The presentation of the query statistics may be broken out by each content source, by each query phrase segmented from the query, and the like. In addition, a preview of a number of content items matching the query parameters is presented based on the data received.

20 Claims, 10 Drawing Sheets

(56) References Cited

U.S. PATENT DOCUMENTS

| | | |
|---|---|---|
| 6,643,694 B1 | 11/2003 | Chernin |
| 6,738,760 B1 | 5/2004 | Krachman |
| 7,043,489 B1 | 5/2006 | Kelley |
| 7,752,204 B2 | 7/2010 | Kao et al. |
| 7,792,789 B2 | 9/2010 | Prahlad et al. |
| 7,809,686 B2 | 10/2010 | McCreight et al. |
| 7,984,039 B2 | 7/2011 | Carmel et al. |
| 8,321,425 B2 | 11/2012 | Custis et al. |
| 2001/0037332 A1 | 11/2001 | Miller et al. |
| 2002/0049756 A1 | 4/2002 | Chua et al. |
| 2002/0161788 A1 | 10/2002 | McDonald |
| 2003/0130953 A1 | 7/2003 | Narasimhan et al. |
| 2003/0131241 A1 | 7/2003 | Gladney |
| 2003/0131244 A1 | 7/2003 | Buoncristiani et al. |
| 2003/0154199 A1 | 8/2003 | Thomas et al. |
| 2004/0003247 A1 | 1/2004 | Fraser et al. |
| 2004/0167979 A1 | 8/2004 | Aikens et al. |
| 2004/0199555 A1 | 10/2004 | Krachman |
| 2004/0267700 A1 | 12/2004 | Dumais et al. |
| 2005/0021725 A1 | 1/2005 | Lobbert |
| 2005/0149496 A1 | 7/2005 | Mukherjee et al. |
| 2005/0149500 A1 | 7/2005 | Marmaros et al. |
| 2006/0048216 A1 | 3/2006 | Hinton et al. |
| 2006/0259449 A1 | 11/2006 | Betz et al. |
| 2007/0050431 A1 | 3/2007 | Vaidya et al. |
| 2007/0073638 A1 | 3/2007 | McVeigh et al. |
| 2007/0112783 A1 | 5/2007 | McCreight et al. |
| 2007/0118529 A1 | 5/2007 | Howell et al. |
| 2007/0192300 A1 | 8/2007 | Reuther et al. |
| 2007/0220268 A1 | 9/2007 | Krishnaprasad et al. |
| 2008/0065683 A1 | 3/2008 | Theeten |
| 2008/0120725 A1 | 5/2008 | Asher et al. |
| 2008/0222296 A1 | 9/2008 | Lippincott et al. |
| 2008/0227063 A1* | 9/2008 | Kenedy ............... G06Q 40/00 434/219 |
| 2008/0288509 A1 | 11/2008 | Mysen et al. |
| 2008/0313148 A1 | 12/2008 | Kuerschner et al. |
| 2009/0046603 A1 | 2/2009 | Tan et al. |
| 2009/0138431 A1 | 5/2009 | Nambiar et al. |
| 2009/0150168 A1* | 6/2009 | Schmidt ............... G06Q 50/18 705/311 |
| 2009/0150887 A1 | 6/2009 | Sanghvi et al. |
| 2009/0150906 A1 | 6/2009 | Schmidt et al. |
| 2009/0164412 A1 | 6/2009 | Bestgen et al. |
| 2009/0164790 A1 | 6/2009 | Pogodin |
| 2009/0187797 A1 | 7/2009 | Raynaud-Richard et al. |
| 2009/0234805 A1 | 9/2009 | Golwalkar et al. |
| 2009/0271412 A1 | 10/2009 | Lacapra et al. |
| 2009/0276467 A1 | 11/2009 | Scholtes et al. |
| 2009/0282060 A1 | 11/2009 | Paulussen et al. |
| 2010/0017366 A1* | 1/2010 | Robertson ......... G06F 17/30867 |
| 2010/0205208 A1 | 8/2010 | Walker |
| 2010/0235354 A1 | 9/2010 | Gargaro et al. |
| 2010/0293178 A1 | 11/2010 | Govani et al. |
| 2010/0325102 A1 | 12/2010 | Maze |
| 2010/0333116 A1 | 12/2010 | Prahlad et al. |
| 2011/0047166 A1 | 2/2011 | Stading et al. |
| 2011/0047189 A1 | 2/2011 | Will et al. |
| 2011/0055192 A1 | 3/2011 | Tang et al. |
| 2011/0082848 A1* | 4/2011 | Goldentouch .... G06F 17/30867 707/706 |
| 2011/0093471 A1 | 4/2011 | Brockway et al. |
| 2011/0202536 A1 | 8/2011 | Chen et al. |
| 2011/0218973 A1 | 9/2011 | Pendlebury et al. |
| 2011/0238620 A1 | 9/2011 | Ramineni et al. |
| 2011/0320494 A1 | 12/2011 | Fisher et al. |
| 2012/0254739 A1 | 10/2012 | Dehmann et al. |
| 2013/0124552 A1* | 5/2013 | Stevenson ......... G06F 17/30864 707/759 |

FOREIGN PATENT DOCUMENTS

| | | |
|---|---|---|
| CN | 101187888 A | 5/2008 |
| CN | 101576977 A | 11/2009 |
| CN | 101789021 A | 7/2010 |
| CN | 101819592 A | 9/2010 |
| JP | 2008117155 | 5/2008 |
| KR | 101064981 B1 | 9/2011 |
| RU | 2420800 | 6/2011 |
| WO | 2007044709 A2 | 4/2007 |
| WO | 2011128945 A1 | 10/2011 |

OTHER PUBLICATIONS

"MIKE2.0", Retrieved from <<http://mike2.openmethodology.org/w/index.php?title=E-Discovery_Solution_Offering&printable=yes>>, Aug. 30, 2011, 5 Pages.
"Supplementary Search Report Issued in European Patent Application No. 12845495.6", dated Jul. 3, 2015, 5 Pages.
"Supplementary Search Report Issued in European Patent Application No. 12847341.0", dated May 18, 2015, 5 Pages.
"Supplementary Search Report Issued in European Patent Application No. 12848846.7", dated Sep. 10, 2015, 7 Pages.
"First Office Action and Search Report Issued in Chinese Patent Application No. 201210435282.9", dated Feb. 2, 2015, 12 Pages.
"Office Action Issued in Chinese Patent Application No. 201210435282.9", dated Jul. 6, 2016, 6 Pages.
"Second Office Action Issued in Chinese Patent Application No. 201210435282.9", dated Sep. 15, 2015, 9 Pages.
"Third Office Action Issued in Chinese Patent Application No. 201210435282.9", dated Mar. 4, 2016, 6 Pages.
"First Office Action and Search Report Issued in Chinese Patent Application No. 201210448829.9", dated Dec. 2, 2014, 14 Pages.
"Fourth Office Action and Search Report Issued in Chinese Patent Application No. 201210448829.9", dated Aug. 29, 2016, 12 Pages.
"Second Office Action Issued in Chinese Patent Application No. 201210448829.9", dated Aug. 11, 2015, 8 Pages.
"Third Office Action and Search Report Issued in Chinese Patent Application No. 201210448829.9", dated Feb. 16, 2016, 14 Pages.
"First Office Action and Search Report Issued in Chinese Patent Application No. 201210452306.1", dated Mar. 3, 2015, 14 Pages.
"Office Action Issued in Chinese Patent Application No. 201210452306.1", dated May 19, 2016, 7 Pages.
"Second Office Action and Search Report Issued in Chinese Patent Application No. 201210452306.1", dated Nov. 11, 2015, 12 Pages.
"Office Action Issued in Russian Patent Application No. 2014117634", dated Aug. 18, 2016, 8 Pages.
Aksyonoff, Andrew, "Sphinx Open Source Search Server", Retrieved from <<http://sphinxsearch.com/docs/latest/index.html>>, Retrieved Date: Sep. 2, 2011, 136 Pages.
Browne, et al., "Technologies for Repository Interoperation and Access Control", In Proceedings of the third ACM Conference on Digital Libraries, May 11, 1998, 9 Pages.
Geier, Chris, "Leveraging Cloud Storage with SharePoint and StoragePoint", Retrieved from <<https://web.archive.org/web/20101217233735/http://storagepoint.com/papers/Leveraging%20Cloud%20Storage%20With%20SharePoint.pdf>>, Jun. 10, 2010, 14 Pages.

(56) References Cited

OTHER PUBLICATIONS

Havre, et al., "Interactive Visualization of Multiple Query Results", In Proceedings of the IEEE Symposium on Information Visualization, Oct. 22, 2001, 8 Pages.

Henseler, Dr. Hans, "Network-Based Filtering for Large Email Collections in E-Discovery", In Proceedings of Global E-Discovery/ E-Disclosure Workshop DESI III, Jun. 8, 2009, 7 Pages.

Joshi, et al., "Improving the Efficiency of Legal E-Discovery Services Using Text Mining Techniques", In Proceedings of Annual SRII Global Conference, Mar. 29, 2011, pp. 448-455.

Ng, et al., "Develop Applications Using IBM InfoSphere eDiscovery Analyzer REST APIs", Retrieved from <<http://public.dhe.ibm.com/software/dw/data/dm-1002infosphererestapis/dm-1002infosphererestapis-pdf.pdf>>, Feb. 11, 2010, 35 Pages.

"International Search Report and Written Opinion Issued in PCT Application No. PCT/US2012/063131", dated Mar. 4, 2013, 9 Pages.

"International Search Report and Written Opinion Issued in PCT Application No. PCT/US2012/064012", dated May 24, 2013, 9 Pages.

"International Search Report and Written Opinion Issued in PCT Application No. PCT/US2012/064252", dated Mar. 11, 2013, 9 Pages.

Rehak, et al., "A Model and Infrastructure for Federated Learning Content Repositories", In Proceedings of Interoperability of Web-Based Educational Systems Workshop, vol. 143, May 10, 2005, 8 Pages.

Yom-Tov, et al., "Learning to Estimate Query Difficulty", In Proceedings of the 28th Annual International ACM SIGIR Conference on Research and Development in Information Retrieval, Aug. 15, 2005, 8 Pages.

Supplementary Search Report Issued in European Patent Application No. 12848846.7, dated Sep. 29, 2015, 1 page.

Japanese Patent Office, Office Action Issued in Japanese Patent Application No. 2014-541109, dated Nov. 18, 2016, 6 Pages.

The State Intellectual Property Office of the People's Republic of China, Fourth Office Action and Search Report Issued in Chinese Patent Application No. 201210435282.9, dated Mar. 14, 2017, 10 Pages.

Notice of Allowance Issued in Russian Patent Application No. 2014117634, dated Mar. 10, 2017, 8 Pages.

\* cited by examiner

FABRIKAM V. CONTOSO – INTERNET EXPLORER

QUERY NAME: CONTACT W/ MARLIN

MARLIN AND (CONTACT OR ((VOICE OR UPDATE) AND (LOG OR ENTRY OR LAST)))

FROM: 1/1/2010  TO: 11/30/2010

AUTHOR/SENDER: BRAD STEVENSON

SAVE
SCOPE...
SEARCH

| MAILBOXES 504A | CONTENT SITES 504B | FILESHARES 504C |

| SUBJECT | RECIPIENT(S) | SENDER | DATE SENT |
| --- | --- | --- | --- |
| NEW NETWORK SWITCHES | PAULA MARLIN | BRAD STEVENSON | 1/2/2010 |
| DAILY SYNC LOGS | REGINA WILCOX; PA... | BRAD STEVENSON | 3/4/2010 |
| FABRIKAM BLOG | PAULA MARLIN | BRAD STEVENSON | 4/2/2010 |
| LOG ENTRIES UPDATE | ADAM BARR; REGIN... | BRAD STEVENSON | 4/2/2010 |
| RE: MOBILE SEARCH - FABRIKAM HEAT PU... | PAULA MARLIN | BRAD STEVENSON | 4/16/2010 |
| NEW NETWORK SWITCHES | PAULA MARLIN | BRAD STEVENSON | 5/2/2010 |
| DAILY SYNC LOGS | REGINA WILCOX; BR... | BRAD STEVENSON | 6/15/2010 |
| VOICE MAIL STORAGE | PAULA MARLIN | BRAD STEVENSON | 6/15/2010 |
| RE: LAST DELIVERABLES FOR VOICE PRO... | ADAM BARR | BRAD STEVENSON | 7/2/2010 |
| NEW FABRIKAM CONTACTS | PAULA MARLIN | BRAD STEVENSON | 7/2/2010 |
| RE: NEW NETWORK SWITCHES | PAULA MARLIN | BRAD STEVENSON | 7/9/2010 |
| HEAT PUMPS | REGINA WILCOX; BR... | BRAD STEVENSON | 7/11/2010 |

QUERY REFINEMENTS

*RECIPIENT*
*DOMAIN*
*MAIL TYPE*
*ATTACHMENT TYPE*
*SPECIFY OTHER*

EXPORT...

*FIG. 5*

LOCATING RELEVANT CONTENT ITEMS ACROSS MULTIPLE DISPARATE CONTENT SOURCES

CROSS-REFERENCE TO RELATED APPLICATION

This application is a Continuation of Ser. No. 13/295,108, filed on Nov. 14, 2011, titled LOCATING RELEVANT CONTENT ITEMS ACROSS MULTIPLE DISPARATE CONTENT SOURCES, the disclosure of which is hereby incorporated by reference in its entirety.

BACKGROUND

A company involved in litigation may be obligated to locate and disclose all relevant "evidence" to opposing counsel. Such evidence may include a variety of electronic content, including email messages, documents and other files, list and other contents maintained on websites, and the like. This electronic content may be located on a number of different types of content servers in the enterprise, each having a different process of indexing and/or searching information. Identifying, preserving, and processing this electronic content across the multiple servers may be difficult, time consuming, and expensive. The amount of data that the company is required to sort through and produce may be vast. In addition, the lack of tools to effectively limit the amount of relevant electronic content disclosed may increase litigation costs due to the manual review needed of all content before it is disclosed.

It is with respect to these considerations and others that the disclosure made herein is presented.

SUMMARY

Technologies are described herein for locating relevant content items across multiple disparate content sources. Utilizing the technologies described herein, a user may leverage search technologies to locate relevant content items from multiple, different content sources, such as email servers, content sites, fileshares, databases and the like, in order to identify, preserve, and process for export the relevant items. For example, a user involved in an e-discovery investigation may utilize the systems, methods, and user interfaces described herein to create targeted search queries against an identified "virtual archive" of items that produce relevant content items for export and disclosure, thereby decreasing the material requiring manual review and reducing cost and risks involved in the corresponding litigation.

According to embodiments, query parameters are received from a user interface for defining a query for searching a number of content sources located on multiple, disparate content servers. A native search is executed on each of the content servers based on the received query parameters, and query statistics and other data regarding content items in the content sources matching the query parameters are received. The query statistics are aggregated across the content servers and presented in the user interface. The presentation of the query statistics may be broken out by each content source, by each query phrase segmented from the query, and the like. In addition, a preview of a number of content items matching the query parameters is presented based on the data received.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5 and 6 are screen diagrams showing an illustrative user interface for previewing results of the query, according to embodiments described herein;

DETAILED DESCRIPTION

The following detailed description is directed to technologies for locating relevant content items across multiple disparate content sources. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
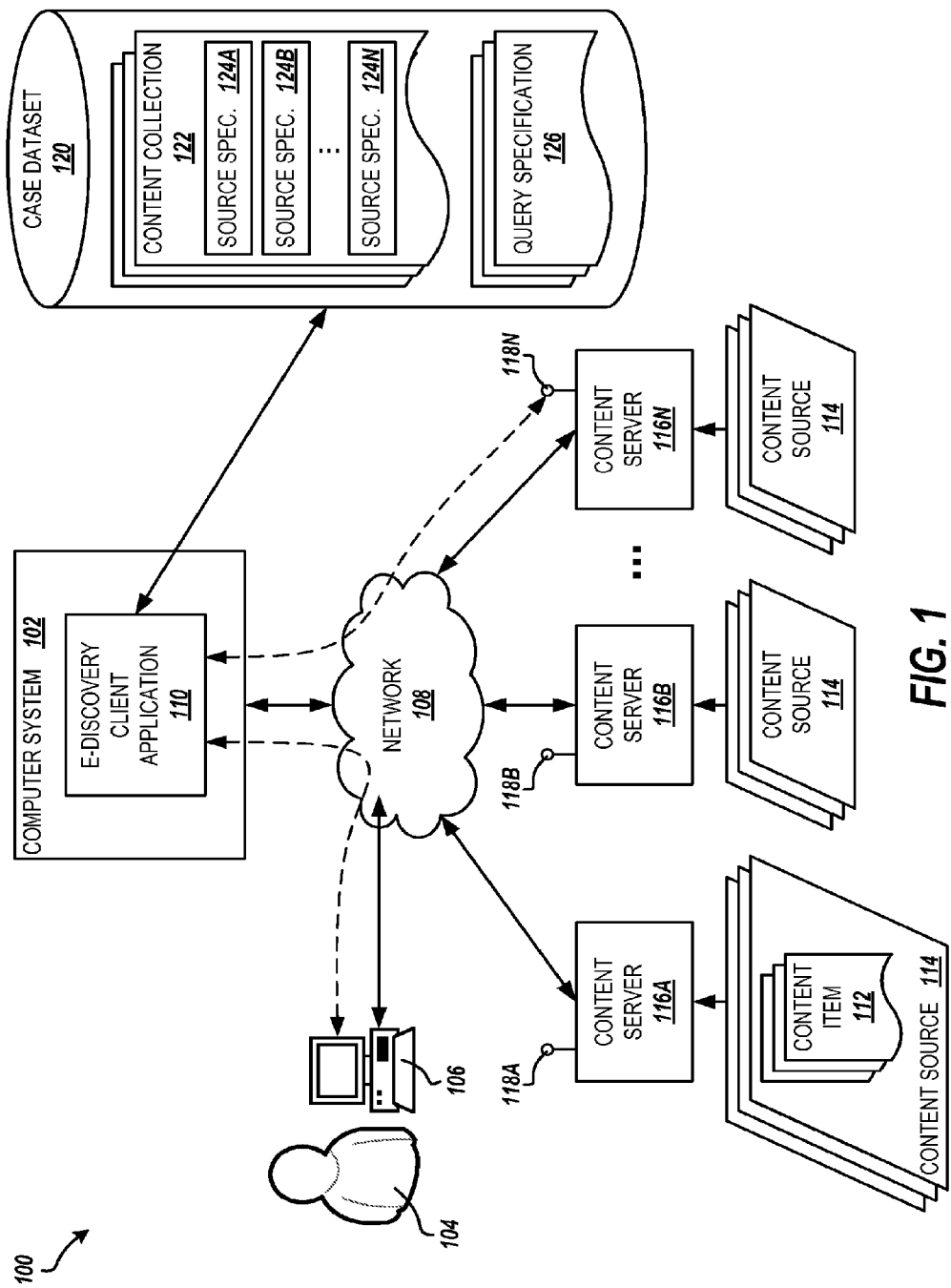
FIG. 1 is a block diagram showing aspects of an illustrative operating environment and software components provided by the embodiments presented herein.

FIG. 1 shows an illustrative operating environment 100 including software components for locating relevant content items across multiple disparate content sources, according to embodiments provided herein. The environment 100 includes a computer system 102. In one embodiment, the computer system 102 represents one or more Web and/or application servers executing web-based application programs and accessed over a network 108 by a user 104 using a Web browser or other client application executing on a user computing device 106. The network 108 may be a local-area network ("LAN"), a wide-area network ("WAN"), the Internet, or any other networking topology known in the art that connects the user computing device 106 to the computer system 102. The user computing device may comprise a personal computer ("PC"), a desktop workstation, a laptop, a notebook, a tablet, a mobile device, a personal digital assistant ("PDA"), a game console, a set-top box, a consumer electronics device, and the like. Alternatively, the computer system 102 may represent a user computing device executing application programs locally, or any combination of server computers and user computing devices.

An e-discovery client application 110 may execute on the computer system 102. The user 104 may utilize the e-discovery client application 110 to identify, preserve, and export a set of content items relevant to a business issue or event, such as litigation or other legal matters, for example. In particular, the e-discovery client application 110 may allow the user 104 to produce targeted search queries to locate relevant content items from a "virtual archive" comprising content items 112 stored in multiple content sources 114. The e-discovery client application 110 may further provide the user 104 with the ability to preview the content items 112 returned by a search, refine the query, and to dispatch a list of the relevant content items 112 for export. Examples of a content source 114 may include an email mailbox; a document library, list item archive, e.g. a discussion thread or Web log ("blog"), or other content site; a fileshare or fileshare folder; a website; and the like. Examples of content items 112 may include email messages; documents or files; webpages; list items, e.g. entries in a discussion thread, blog posts, or wiki page entries; and the like. According to embodiments, the content items 112 may be stored on and/or accessed through multiple, disparate content servers 116A-116N (also referred to herein generally as content servers 116 or content server 116).

In one embodiment, the content servers 116 include one or more email servers, such as MICROSOFT® EXCHANGE SERVER email servers from Microsoft Corporation of Redmond, Wash. The content servers 116 may also include one or more content site servers, such as MICROSOFT® SHAREPOINT® servers, also from Microsoft Corporation. The content servers 116 may also include one or more file servers, NAS storage devices, or other file and document storage systems. In other embodiments, the content servers 116 may include document management servers, database servers, Web servers, and other data and content servers known in the art.

According to other embodiments, each content server 116A-116N may provide a corresponding search interface 118A-118N (also referred to herein as search interfaces 118 or search interface 118) for searching the content items 112 stored on and/or accessed through the content server. For example a content server 116A comprising an email server may provide a search interface 118 that allows content items 112 comprising email messages contained in content sources 114 comprising email mailboxes to be searched by external applications, such as the e-discovery client application 110 executing on the computer system 102. In one embodiment, the content server 116 maintains one or more indexes supporting the searching of associated content items 112 through the search interface 118. The search interface 118 may comprise an application programming interface ("API") that defines SOAP-based Web services, Java RMI calls, WINDOWS® communication foundation ("WFC") services, RPC calls, and the like.

The e-discovery client application 110 may access a case dataset 120 that defines the various content sources 114 containing the content items 112 comprising the virtual archive of items to be searched. The case dataset 120 may represent an XML file, one or more database tables in a database, or any other structured storage mechanism known in the art stored on or accessible to the computer system 102. The case dataset 120 may be built by the user 104 utilizing the e-discovery client application 110 or another application based on content sources deemed potentially relevant to the litigation other business issue/event at hand. In one embodiment, the case dataset 120 may be built by the user 104 using methods and user interfaces similar to that described herein for locating relevant content items 112 in the virtual archive.

The case dataset 120 may contain one or more content collections 122, each content collection 122 comprising one or more source specifications 124A-124N (also referred to herein as source specifications 124 or source specification 124). Each source specification 124 may identify a specific content source 114 containing content items 112 that collectively make up the virtual archive. For example, one source specification 124A may identify a specific personal mailbox stored on or accessed through an email content server 116A. Another source specification 124B may identify a document library accessed through a content server 116B hosting a content site. Organizing the source specifications 124 into content collection(s) 122 allows configuration options for the virtual archive to be applied to at a content collection level, such as whether content items 112 should be preserved in place or copied to an archive and the like. In addition, filters may be applied at the content collection level to further limit the content items 112 from the specified content sources 114 to be included in the virtual archive. Filters may include date-ranges for email messages sent or documents created or modified, author/sender of documents or email messages, keyword filters, and the like. In other embodiments, filters may further be specified at a content sources level, i.e. per source specification 124, or for the entire virtual archive defined in the case dataset 120.

The case dataset 120 may further contain one or more query specifications 126. Each query specification 126 defines a query that is used to search the content sources 114 comprising the virtual archive as defined by the source specifications 124 to locate relevant content items 112. According to embodiments, the users may utilize e-discovery client application 110 to build the query specifications 126 and save them to the case dataset 120. The e-discovery client application 110 may further parse the query specification 126 and utilize the search interface 118 of each content server 116 identified by the source specifications 124 to execute the query against each content source 114. Statistics regarding the query as executed against each content source 114 may then be aggregated by the e-discovery client application 110 and presented to the user 104, as will be described in more detail below. In addition, the e-discovery client application 110 may combine data regarding the content items 112 located by each content server 116 in order to present a preview of the results to the user 104 to allow for further refinement of the query.

Finally, the e-discovery client application 110 may generate a manifest of all the relevant content items 112 located by the query(s) from the various content sources 114. The manifest may then be dispatched to an export application that may utilize additional interfaces of each content server 116 to retrieve the content items 112 specified in the manifest and save them to a case export file, as is described in co-pending U.S. patent application Ser. No. 13/293,146 filed Nov. 10, 2011, and entitled "Export of Content Items from Multiple, Disparate Content Sources," which is incorporated herein by this reference in its entirety.

Figure 2:
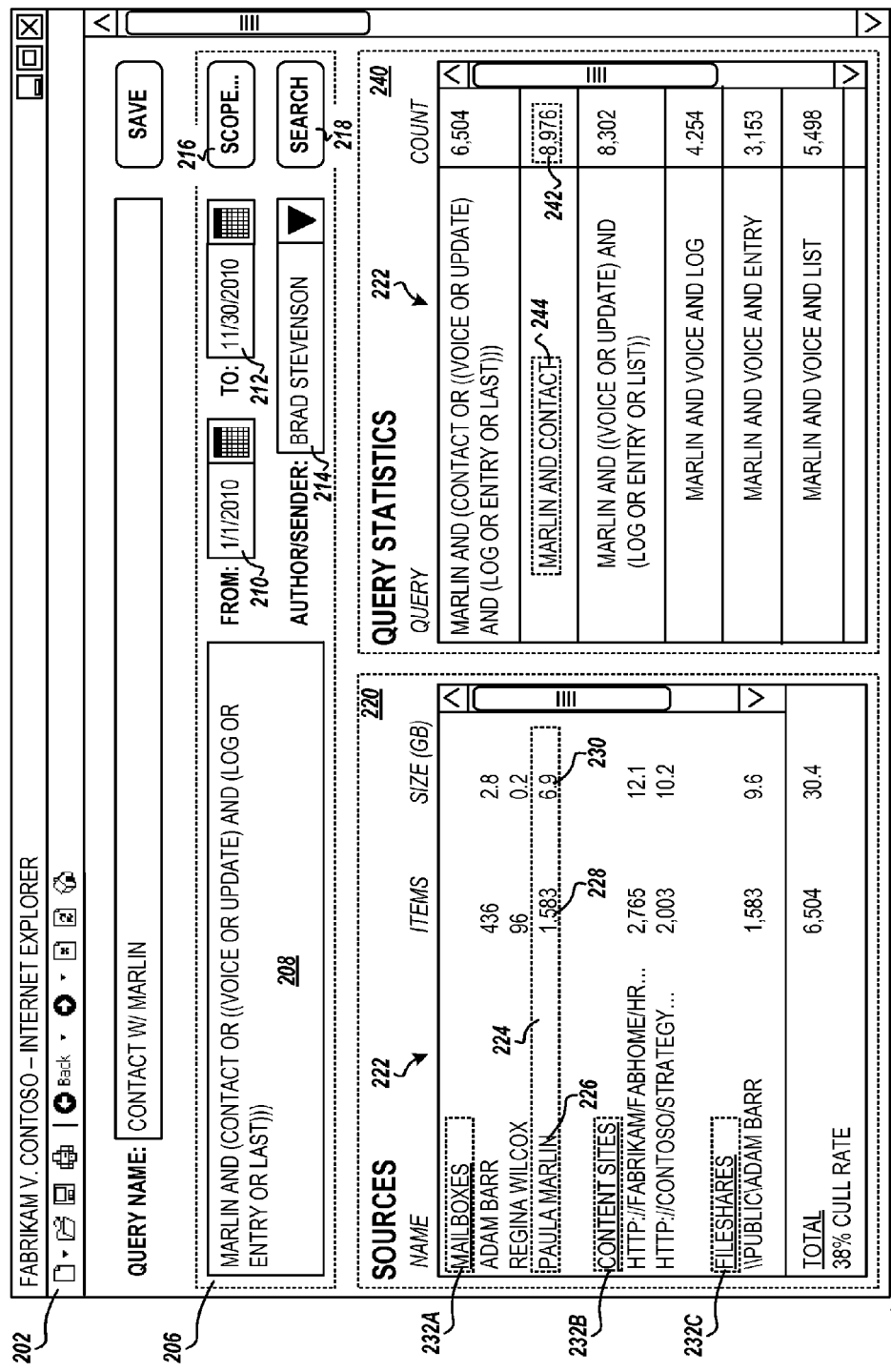
FIGS. 2 and 3 are screen diagrams showing an illustrative user interface for defining a query for locating content items across multiple content sources and providing query statistics regarding the results of the query, according to embodiments described herein.

FIG. 2 shows an illustrative user interface ("UI") 200 for defining a query to search the content sources 114 of the virtual archive as defined by the source specifications 124 contained in the case dataset 120. The UI 200 may be presented by the e-discovery client application 110 to the user 104 in a browser window 202 rendered by a Web browser application executing on the user computing device 106, for example.

The UI 200 includes a query specification section 206 where the parameters defining the query may be specified by the user 104. For example, the query specification section 206 may contain a field allowing the user to specify free-text query 208 in any suitable syntax, such as a keyword query language ("KQL") query, which may include keywords for the query along with junction words, grouping parenthesis, and the like. In one embodiment, the free-text query 208 may further include advanced query syntax/specifications, such as property restrictions using the "property:value" syntax, for example. According to embodiments, the syntax of the free-text query 208 may be independent of the form or syntax of the query required by search interface 118 of each content server 116 to search the content sources 114. The e-discovery client application 110 will parse the free-text query 208 and translate the query to the proper form and/or syntax for the content servers 116 when the query is executed.

The query specification section 206 may also contain fields that allow the user 104 to specify a from-date value 210 and to-date value 212 defining a date-range parameter for the query. The date-range parameter may be applied to specific properties of content items 112 depending on their type, such as the sent date of email messages, the creation or modification date of documents or files, the posting date for discussion entries, and the like. The query specification section 206 may also contain a field that allows the user 104 to specify an author/sender parameter 214. Similar to the date-range parameter, the author/sender parameter 214 may be applied to specific properties of content items 112 depending on their type, such as the sender of email messages, the creator of documents, the poster of discussion entries, and the like.

Figure 3:
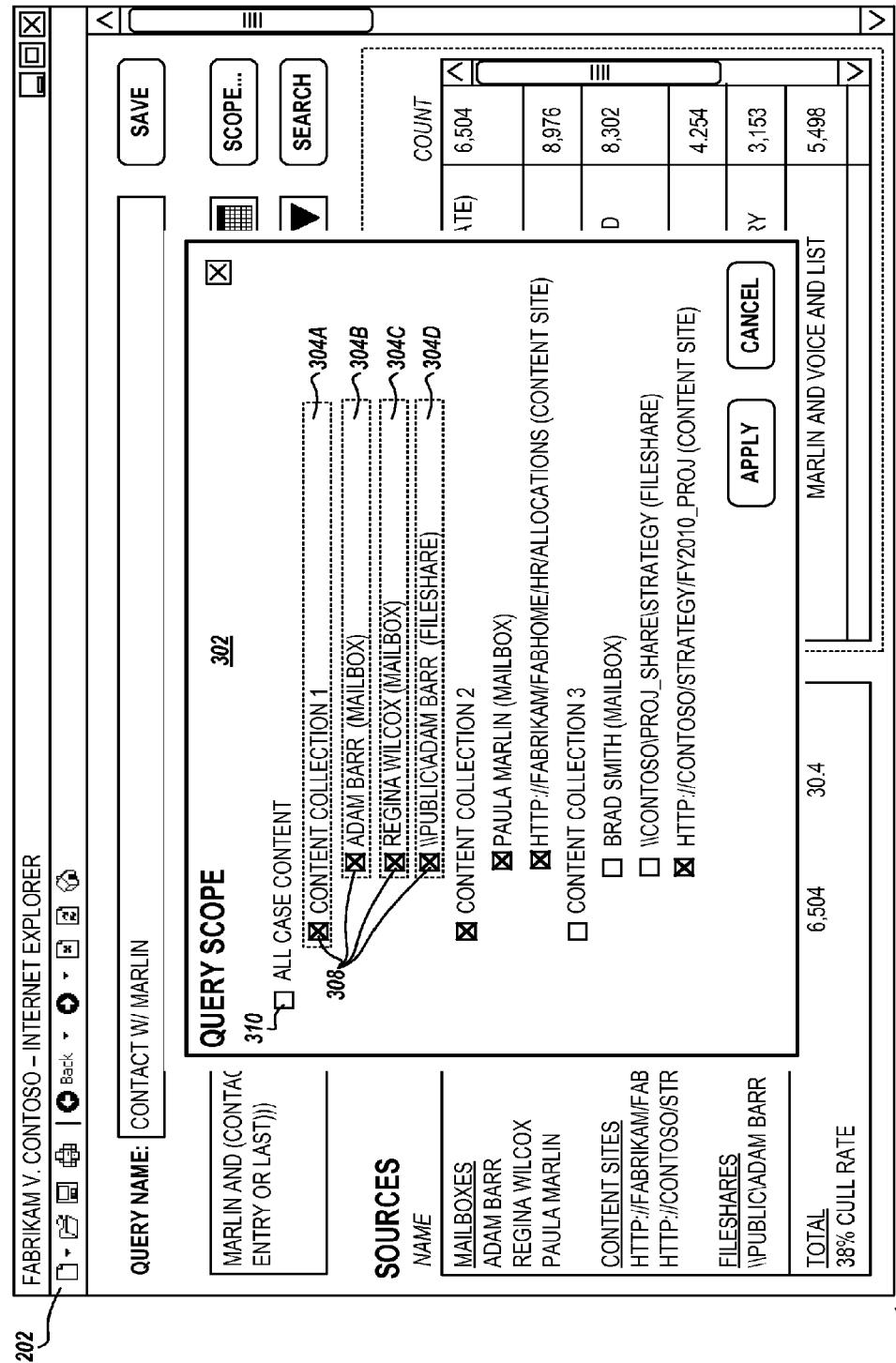

The UI 200 may further include a mechanism for specifying a scope of the query being defined, i.e. those content sources 114 of the virtual archive to which the query is to be applied. For example, the UI 200 may include a scope UI control 216 that, when selected by the user 104, causes a query scope specification panel 302 to be displayed in the window 202, as shown in FIG. 3. The query scope specification panel 302 may include a list of content item groupings, such as content item groupings 304A-304D, corresponding to the content collections 122 and/or source specifications 124 contained in the case dataset 120. In addition, the content item groupings 304A-304D may be presented in a hierarchical fashion. For example, content item grouping 304A may correspond to a first content collection 122 defined in the case dataset 120, while content item groupings 304B-304D may correspond to source specifications 124 for three content sources 114, one for a personal mailbox for "Adam Barr," one for a personal mailbox for "Regina Wilcox," and one for a fileshare located at "\\PUBLIC\ADAM BARR," each of which are included in the first content collection 122.

Each content item grouping 304A-304D may further include an inclusion UI control 308 that allows the user 104 to specify whether content source(s) 114 identified by the corresponding source specification 124 or content collection 122 are to be included in the scope of the query being defined. The query scope specification panel 302 may also include a select all UI control 310 that allows the user 104 to specify that all content sources 114 identified the case dataset 120 are to be included in the search.

Returning to FIG. 2, the UI 200 may further include a source query statistic section 220 that provides the user 104 with query statistics 222 regarding the execution of the defined query against the content sources 114 identified in the query scope. For example, the user may utilize an execute query UI control 218 to cause the e-discovery client application 110 to parse the query parameters and utilize the search interface 118 of each content server 116 identified by the source specifications 124 to execute a native query against the specified content sources 114. Query statistics 222 regarding the query as executed against each content source 114 may then be aggregated by the e-discovery client application 110 and presented in the source query statistic section 220 of the UI 200.

According to one embodiment, the query statistics 222 may include a list of content source entries, such as content source entry 224, corresponding to each content source 114 included in the scope of the query. The content source entry 224 may include an identifier of the corresponding content source 114, as shown at 226, a count of the number of content items 112 located in the content source that match the query parameters, as shown at 228, a total size of the content items located, as shown at 230, and the like. The content source entries 224 in the query statistics may be further grouped under grouping headers 232A-232C. For example, the content source entries 224 may be grouped by a type of the corresponding content source 114, as shown in FIG. 2. The content source entries 224 may also be grouped by content collection 122, by content server 116, or by other groups. In one embodiment, the grouping of the content source entries 224 corresponding to the content sources 114 in the query statistics may be selected by the user 104 through the UI 200. The query statistics 222 may further include sub-totals and totals of the count and/or size of the located content items 112, a percentage of items located versus total content items in the content sources 114, and the like.

Figure 4:
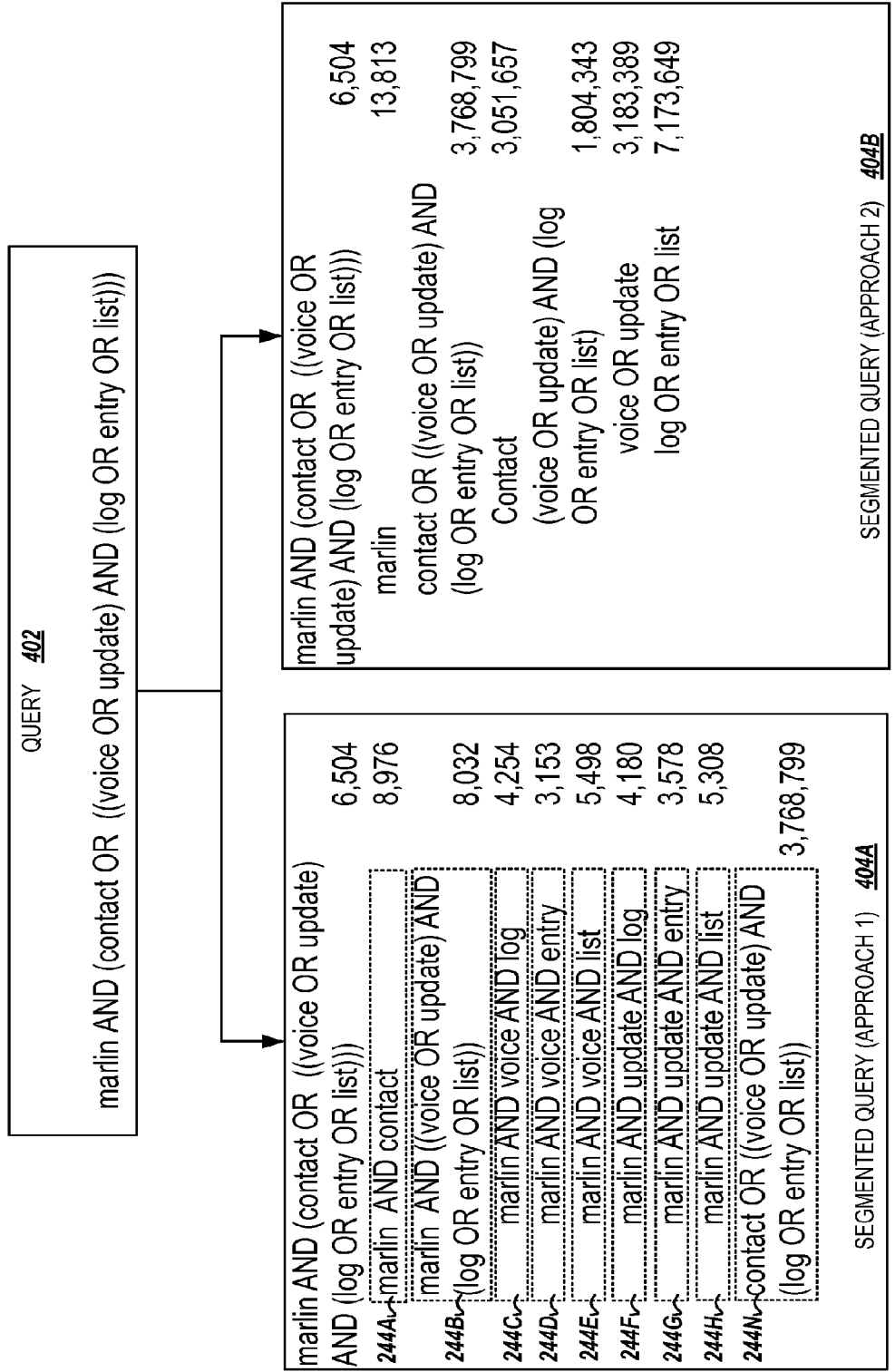
FIG. 4 is a is a block diagram showing multiple examples of the segmentation of queries for generation of query statistics, according to embodiments described herein.

The UI 200 may also include a query segmentation statistic section 240 that provides the user 104 with additional query statistics 222 regarding the execution of the defined query. The additional query statistics 222 may further include a count of content items 112 located by the query, as shown at 242, broken down by various phrases, such as query phrase 244, of the free-text query 208 specified in the query parameters. The segmentation of the query may be performed by the e-discovery client application 110 in a variety of ways. As shown at 404A in FIG. 4, in one embodiment a query may be divided into query phrases 244A-244N at each explicit or implied OR, such as query phrases 244A and 244B segmented from the main body of the query 402.

The segmentation process may be performed iteratively based on explicit groupings in the query 402 by parenthesis or implied groupings in the query based on operator precedence, syntax, and the like. For example, the query phrase 244B may be further segmented into query phrases 244C-244H using the same process. The resulting query phrases 244A-244N may be presented in a hierarchical fashion representing the groupings in the query 402. In another embodiment, the query 402 may be divided into query phrases 244 at each explicit or implied AND, as shown at 404B in FIG. 4. As shown in FIG. 2, the count of content items 112 matching each query phrase 244 is further shown in the query segmentation statistic section 240. The counts may be generated for each query phrase 244 by the content servers(s) 116 and/or the e-discovery client application 110 may perform a search operation with each individual query phrase 244 in order to aggregate the query statistics 222 for presentation in the query segmentation statistic section 240. It will be appreciated that the query statistics 222 presented in the source query statistic section 220 and the query segmentation statistic section 240 may be updated each time the query parameters defined for the query are modified by the user, or the query parameters FIG. 5 shows another illustrative UI 500 for providing the user a preview of the content items 112 located by the query defined in the query specification section 206. As described above, the e-discovery client application 110 may further provide the user 104 with the ability to preview the content items 112 returned by a search and further refine the query in order to locate only relevant content items for export. The UI 500 may be presented by the e-discovery client application 110 to the user 104 in a browser window 202 rendered by a Web browser application executing on the user computing device 106, for example. The e-discovery client application 110 may render the UI 500 in addition to or as an alternative to the UI 200 described above in regard to FIGS. 2-4.

The UI 500 includes the query specification section 206 detailing the parameters defined for the query as well as a result list 502 comprising content item entries, such as content item entry 506, containing data regarding each previewed content item 112 matching the search parameters. Different result lists 502 may be provided for different types of content sources 114, selectable by the user through a tab metaphor, as shown in FIG. 5, or another UI mechanism known in the art. For example, each type category of content source 114 may have a corresponding tab 504A-504C showing a result list 502 containing data specific to content items 112 of that type. For example, for content sources 114 comprising email mailboxes, each content item entry 506 in the result list 502 on a "MAILBOXES" tab 504A may include header information for the corresponding email message, such as a subject, the recipients, the sender, the date sent, and the like. For content sources 114 comprising document libraries or fileshares, each content item entry 506 in the result list 502 on a "FILESHARES" tab 504C may include digest information for the corresponding document of file, such as a document title or filename, a file type, an author, the creation date, the last modification date, and the like.

In another embodiment, the content item entries 506 in the result list 502 may contain additional data from the previewed content item 112, such as the first few lines of the body of an email message, a thumbnail image of a document or file, and the like. In another embodiment, each tab 504A-504C corresponds to the search mechanism or index that results in surfacing content items 112 from the content source 114. Therefore a result list 502 containing email messages from email mailboxes and files from fileshares may be listed under an "ENTERPRISE" tab corresponding to an enterprise-wide search index, while documents from document libraries and list items from blogs or discussion groups may appear in a result list under the "CONTENT SITES" tab 504B corresponding to search indexes from one or more content sites. In further embodiments, each tab 504A-504C may correspond to a type of content server 116, a specific content server, or other categories or grouping of content items 112, content sources 114, and/or content servers.

Figure 6:
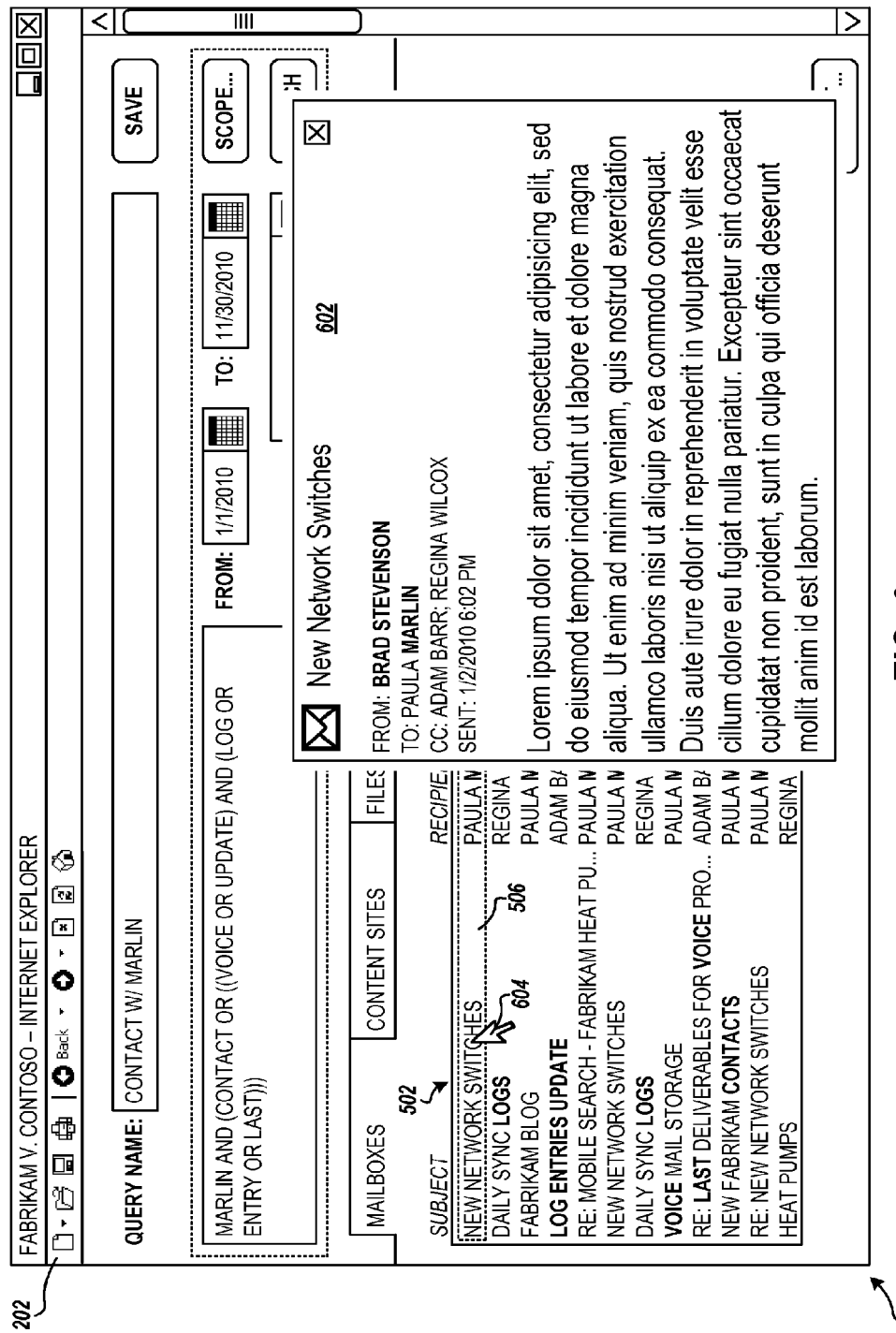

The e-discovery client application 110 may retrieve header or digest information for the top-N matching content items 112 of the type corresponding to the selected tab 504A-505C from the identified content servers 116 based on a default or user-selectable sort order, for example, for display in the results list 502. The header or digest information may be retrieved from the content servers 116 through the corresponding search interfaces 118 or through another API specific to the content server type. In addition, the data may be retrieved by the e-discovery client application 110 asynchronously as the query is modified by the user 104 and/or as the query statistics 222 are updated in the UI 200. In addition, as shown in FIG. 6, the e-discovery client application 110 may retrieve the entire contents of a content item 112 and display it in a preview pane 602 when the corresponding content item entry 506 in the result list 502 is selected by the user, by hovering a mouse pointer 604 over the entry, for example.

Figure 7:
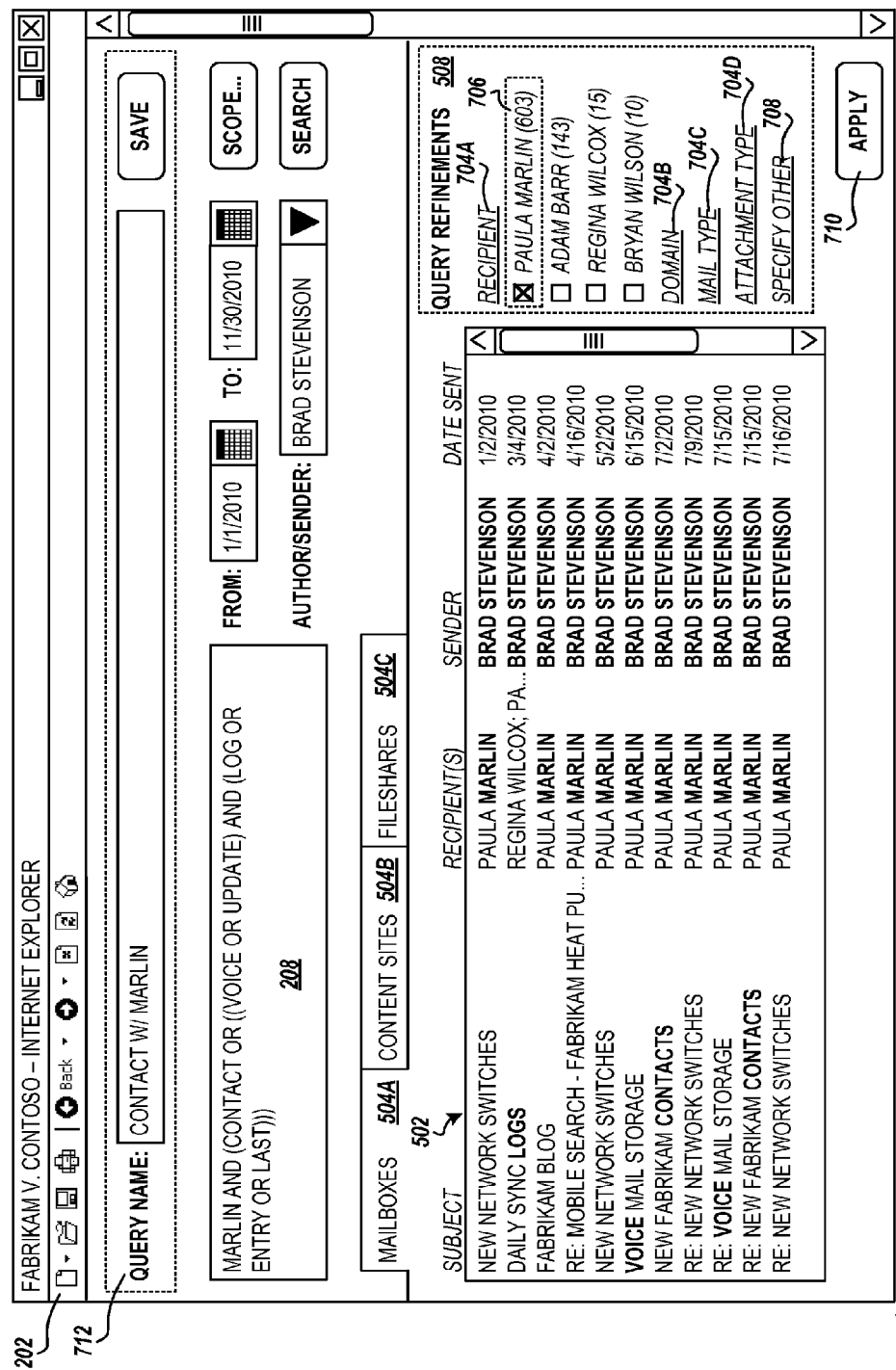
FIG. 7 is a screen diagram showing an illustrative user interface for accepting refinements to the query results, according to embodiments described herein.

Referring now to FIG. 7, the UI 500 may further contain a query refinement section 508 that allows further refinements to the query to be made by the user 104. The query refinement section 508 may contain a list of properties or "filter categories" 704A-704D (referred to herein general as filter categories 704) for which values for refinement of the query may be selected. The filter categories 704 presented to the user 104 may be specific to the type of content sources 114 for which the previewed content items 112 are being presented. For example, as shown in FIG. 7, if the email messages are being previewed in the result list 502 on the "MAILBOXES" tab 504A, the filter categories 704A-704D may comprise properties of email messages, such as recipient, domain, mail type, attachment type, and the like. Additional and/or alternative filter categories 704 may be shown with result lists 502 on other tabs 504B, 504C containing content items 112 of different types.

If the user 104 selects a particular filter category, such as filter category 704A, the user may be further presented with a list of value entries, such as value entry 706, for the selected filter category generated from the previewed content items 112. In one embodiment, each value entry 706 listed may further include query statistics showing a count of content items 112 from the current query having the property matching the corresponding value, as further shown in FIG. 7. The user 104 may select one or more of the listed value entries 706 for the selected filter category 704, and then select a UI control, such as the apply pushbutton UI control 710, to apply the selected filter category/value pairs to the query. Applying the selected filter category/value pairs to the query may both update the query statistics 222 presented in the UI 200 as well as updating the previewed content items 112 shown in the results list 502 on the currently selected tab 504A. In another embodiment, the selected filter category/ value pairs may be added to the free-text query 208 in the query parameters, uses the "property:value" syntax, for example. The user 104 may then re-arrange, group, and change junction operators for the filter category/value pairs in the free-text query 208 to further refine the query.

According to one embodiment, only one filter category 704A-704D may be open and modified at a given time. If the user 104 is modifying one filter category 704A and then switches to another before selecting the apply pushbutton UI control 710, the e-discovery client application 110 may warn the user that any changes to the filter category will not be saved unless they select the apply pushbutton. In another embodiment, the user 104 is provided with a custom filter UI control 708 that allows the user to specify an unlisted value for one of the filter categories 704A-704D and/or to specify value(s) for another property or filter category for the content source type beyond the filter categories shown. Selecting the custom filter UI control 708 may turn the UI control into a text box, where the user can enter the additional filter category/value pair in the "property:value" syntax, for example.

The UI 500 may further include a query save section 712 that allows the query to be saved as a corresponding query specification 126 in the case dataset 120, as described above in regard to FIG. 1. The user may be presented with a UI control to provide a name or other identifier to associate with the query specification 126. According to embodiments, all query parameters for the query are saved to the corresponding query specification 126, including the free-text query 208, the date-range parameter, the author/sender parameter 214, the source specifications 124 and/or content collections 122 comprising the query scope, any filter category/value pairs selected in the query refinement section 508, and the like. In addition, the query statistics 222 last generated by the content servers 116 may be stored with the corresponding query specification 126 for later retrieval. In one embodiment, the user 104 may be provided the ability to copy the query parameters from an existing query specification 126 to create a new query, which may then be modified while the existing query specification 126 remains intact.

Figure 8:
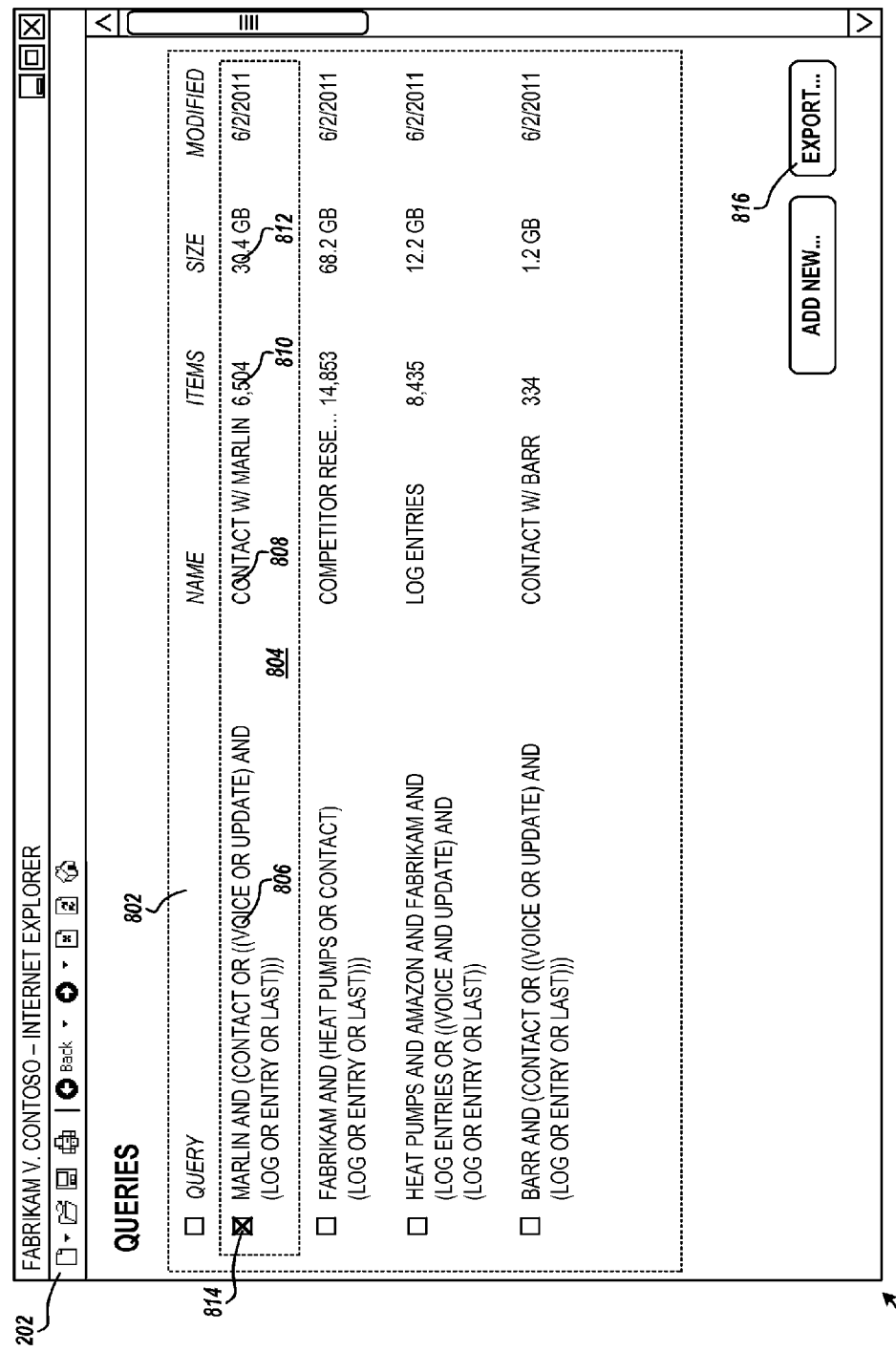
FIG. 8 is a screen diagram showing an illustrative user interface for managing multiple saved queries, according to embodiments described herein.

FIG. 8 shows another illustrative UI 800 for the management of saved queries, according to further embodiments. The UI 800 may be presented by the e-discovery client application 110 to the user 104 in a browser window 202 rendered by a Web browser application executing on the user computing device 106, for example. The UI 800 may include a query list 802 including query entries, such as query entry 804, for the query specification 126 saved in the in the case dataset 120. Each query entry 804 may include the free text query 806 from the query specification 126, along with the name 808 or other identifier associated with the query when saved by the user 104. In addition, the query entry 804 may include query statistics 222, such as a total count 810 and total size 812 of content items 112 matching the query. The query statistics 222 from the last execution of the query may have been stored with the corresponding query specification 126 when the user 104 saved the query, as described above in regard to FIG. 7.

According to embodiments, each query entry 804 may further include a query selection control 814 that allows the user 104 to select one or more queries in the query list 802. The user 104 may then select an export UI control 816 that will cause the e-discovery client application 110 to generate a manifest of all the relevant content items 112 from all content sources 114 across all content servers 116 that match one or more of the selected query(s) and dispatch the manifest to an export application that retrieves the content items 112 specified and saves them to a case export file, as described above in regard to FIG. 1.

Figure 9:
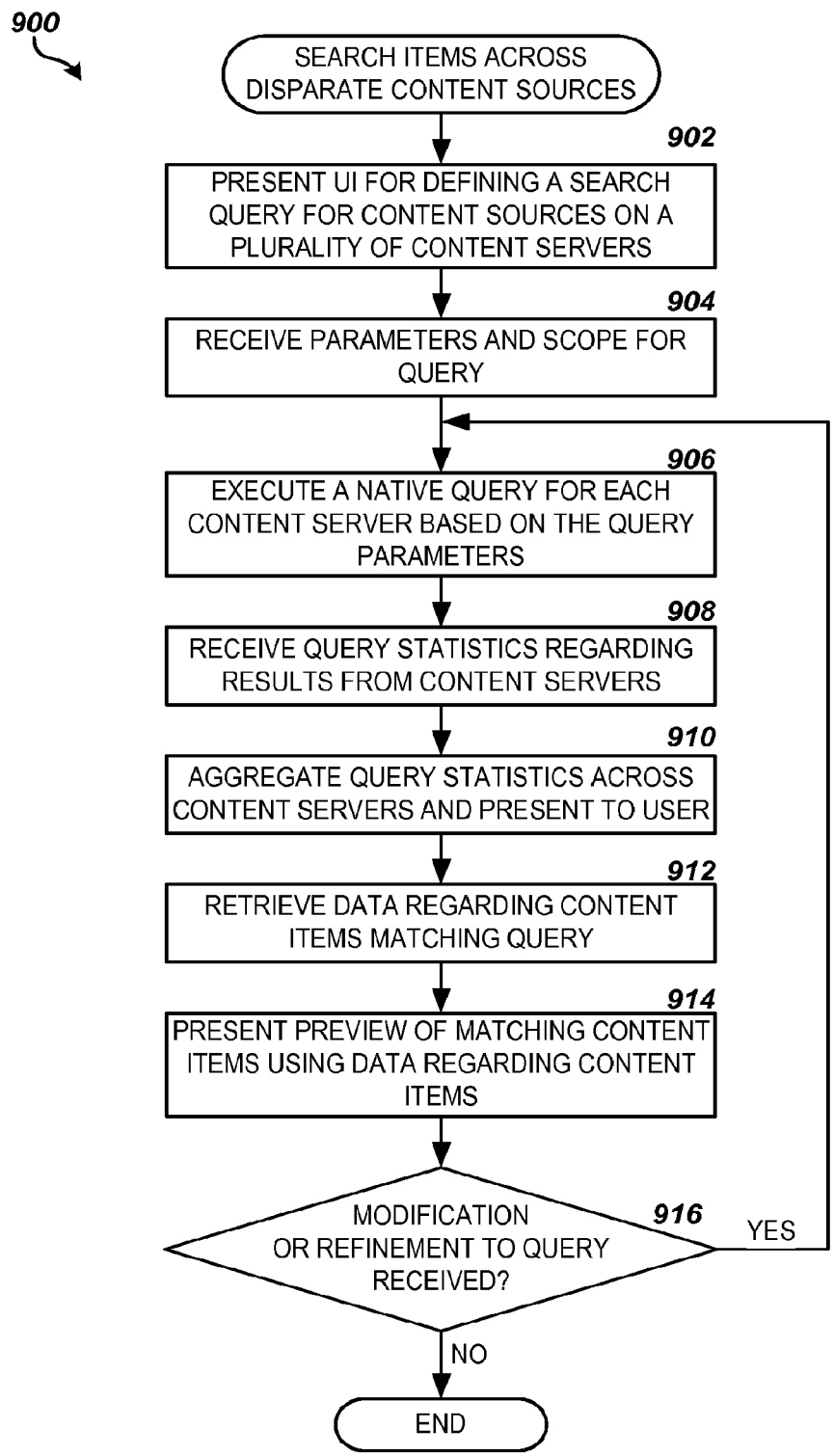
FIG. 9 is a flow diagram showing one method for locating relevant content items across multiple disparate content sources, according to embodiments described herein.

Referring now to FIG. 9, additional details will be provided regarding the embodiments presented herein. It should be appreciated that the logical operations described with respect to FIG. 9 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 9 illustrates one routine 900 for locating relevant content items across multiple disparate content sources, according to one embodiment. The routine 900 may be performed by the e-discovery client application 110 executing on the computer system 102, for example. It will be appreciated that the routine 900 may also be performed by other modules or components executing on the computer system 102, or by any combination of modules, components, and computing devices. The routine 900 begins at operation 902, where the e-discovery client application 110 presents a UI to a user 104 for defining a query to search the content sources 114 of the virtual archive as defined by the source specifications 124 contained in the case dataset 120. According to embodiments, the source specifications 124 may identify content sources 114 on multiple, disparate content servers 116, such as email mailboxes on an email server, a document library on a content site server, and/or a fileshare on a file server.

The e-discovery client application 110 may present the UI 200 described above in regard to FIGS. 2 and 3 to the user 104 for defining the query. The UI 200 may be presented by the e-discovery client application 110 to the user 104 in a browser window 202 rendered by a Web browser application executing on the user computing device 106, for example. The UI 200 may include a query specification section 206 that allows the user to specify parameters defining the query, such as a free-text query 208, a date-range parameter, an author/sender parameter 214, and the like. The UT 200 may further include a query scope specification panel 302 that allows the user to specify the content collections 122 and/or source specifications 124 contained in the case dataset 120 to which the query is to be applied.

The routine 900 proceeds from operation 902 to operation 904, where the e-discovery client application 110 receives the query parameters and/or query scope from the user 104 through the UI 200, as described above. In another embodiment, the user 104 may load the query parameters and query scope from a query specification 126 previously saved to the case dataset 120. From operation 904, the routine 900 proceeds to operation 906, where the e-discovery client application 110 executes a native search of each content server 116 specified in the source specifications 124 comprising the query scope. As described above, the e-discovery client application 110 may parse the query parameters and utilize the search interface 118 of each content server 116 identified by the source specifications 124 to execute a native query against the specified content sources 114. According to one embodiment, the e-discovery client application 110 may provide the user 104 with a user interface to view and/or modify the native queries generated for the various content servers 116.

The routine 900 proceeds from operation 906 to operation 908 where the e-discovery client application 110 receives query statistics 222 regarding the query as executed against each content source 114 from the content servers 116. The e-discovery client application 110 may receive raw statistics broken out by one or more of the content source 114, query phrases 244 segmented from the free-text query 208, and the like. It will be appreciated that the query statistics 222 received from the content servers 116 may include a variety of information at different levels, and that different types of content servers 116 may return different levels of query statistics from the query. In one embodiment, the e-discovery client application 110 receives header or digest information regarding the content items 112 in the content sources 114 that match the query, and the e-discovery client application generates the query statistics 222 from this information.

At operation 910, the e-discovery client application 110 aggregates the query statistics 222 regarding the various content sources 114 received from the content servers 116 and presents the aggregated statistics to the user 104. The e-discovery client application 110 may present query statistics 222 broken out by each content source 114 included in the scope of the query, as shown in the source query statistic section 220 of the UI 200 described above in regard to FIG. 2. The query statistics 222 may further include sub-totals and totals of the count and/or size of the located content items 112, a percentage of items located versus total content items in the content sources 114, and the like. The e-discovery client application 110 may further present query statistics 222 broken out by various phrases of the query, as further shown in the query segmentation statistic section 240 of the UI 200 described above in regard to FIGS. 2 and 4.

From operation 910, the routine 900 proceeds to operation 912, where the e-discovery client application 110 retrieves data regarding the content items 112 in the various content sources 114 matching the query parameters. As described above in regard to FIG. 5, the e-discovery client application 110 may retrieve header or digest information for a number of matching content items 112 from the identified content servers 116 based on a default or user-selectable sort order, for example. The header or digest information may be retrieved from the content servers 116 through the corresponding search interfaces 118 or through another API specific to the content server type.

The routine 900 proceeds from operation 912 to operation 914, where the e-discovery client application 110 presents the retrieved header or digest information to the user 104 as a preview of matching content items 112. For example, the e-discovery client application 110 may present the UI 500 described above in regard to FIGS. 5 and 6 that allows the user to preview matching content items 112 by content source type. In one embodiment, the previewed content items 112 may be de-duplicated at each content server 116 for content sources 114 served by that content server or similar content servers. In another embodiment, the e-discovery client application 110 may perform additional or alternative de-duplication of matching content items 112 across content sources 114 and content servers 116 before presenting the query statistics 222 and/or previewed content items 112 to the user 104.

From operation 914, the routine 900 proceeds to operation 916, where the e-discovery client application 110 may receive a change or refinement to the query. For example the user 104 may change one or more of the query parameters in the query specification section 206 of the UI 200 or the query scope in the query scope specification panel 302 as described above in regard to FIGS. 2 and 3. The user 104 may additionally or alternatively select or specify one or more filter category/value pairs from the query refinement section 508 of the UI 500 described above in regard to FIG. 7. If a change or refinement to the query is received, the routine 900 returns to operation 906, where the e-discovery client application 110 re-executes the modified query against each content server 116 and collects and presents the query statistics 222 and previewed content items 112 to the user 104, as described above. If no changes or refinements to the query is received by the e-discovery client application 110 at operation 916, then the routine 900 ends.

Figure 10:
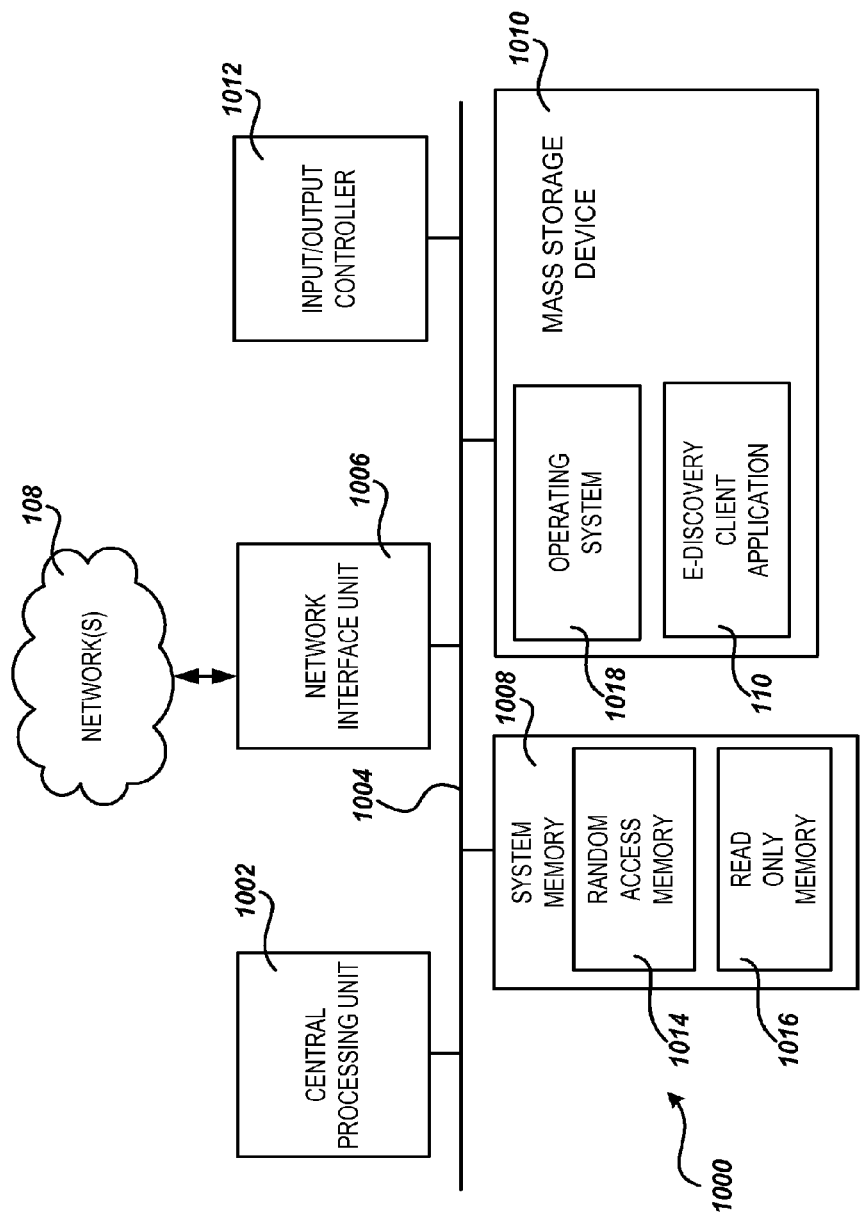
FIG. 10 is a block diagram showing an illustrative computer hardware and software architecture for a computing system capable of implementing aspects of the embodiments presented herein.

FIG. 10 shows an example computer architecture for a computer 1000 capable of executing the software components described herein for locating relevant content items across multiple disparate content sources, in the manner presented above. The computer architecture shown in FIG. 10 illustrates a server computer, a conventional desktop computer, laptop, notebook, tablet, PDA, wireless phone, or other computing device, and may be utilized to execute any aspects of the software components presented herein described as executing on the computer system 102, the user computing device 106, and/or other computing device.

The computer architecture shown in FIG. 10 includes one or more central processing units ("CPUs") 1002. The CPUs 1002 may be standard processors that perform the arithmetic and logical operations necessary for the operation of the computer 1000. The CPUs 1002 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 1008, including a random access memory ("RAM") 1014 and a read-only memory 1016 ("ROM"), and a system bus 1004 that couples the memory to the CPUs 1002. A basic input/output system containing the basic routines that help to transfer information between elements within the computer 1000, such as during startup, is stored in the ROM 1016. The computer 1000 also includes a mass storage device 1010 for storing an operating system 1018, application programs, and other program modules, which are described in greater detail herein.

The mass storage device 1010 is connected to the CPUs 1002 through a mass storage controller (not shown) connected to the bus 1004. The mass storage device 1010 provides non-volatile storage for the computer 1000. The computer 1000 may store information on the mass storage device 1010 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 1000 may store information to the mass storage device 1010 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 1000 may further read information from the mass storage device 1010 by detecting the physical states or characteristics of one or more particular locations within the mass storage device.

As mentioned briefly above, a number of program modules and data files may be stored in the mass storage device 1010 and RAM 1014 of the computer 1000, including an operating system 1018 suitable for controlling the operation of a computer. The mass storage device 1010 and RAM 1014 may also store one or more program modules. In particular, the mass storage device 1010 and the RAM 1014 may store the e-discovery client application 110, which was described in detail above in regard to FIG. 1. The mass storage device 1010 and the RAM 1014 may also store other types of program modules or data.

In addition to the mass storage device 1010 described above, the computer 1000 may have access to other computer-readable media to store and retrieve information, such as program modules, data structures, or other data. It should be appreciated by those skilled in the art that computer-readable media may be any available media that can be accessed by the computer 1000, including computer-readable storage media and communications media. Communications media includes transitory signals. Computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 1000.

The computer-readable storage medium may be encoded with computer-executable instructions that, when loaded into the computer 1000, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 1000 by specifying how the CPUs 1002 transition between states, as described above. According to one embodiment, the computer 1000 may have access to computer-readable storage media storing computer-executable instructions that, when executed by the computer, perform the routine 900 for locating relevant content items across multiple disparate content sources described above in regard to FIG. 9.

According to various embodiments, the computer 1000 may operate in a networked environment using logical connections to remote computing devices and computer systems through one or more networks 108, such as a LAN, a WAN, the Internet, or a network of any topology known in the art. The computer 1000 may connect to the network 1020 through a network interface unit 1006 connected to the bus 1004. It should be appreciated that the network interface unit 1006 may also be utilized to connect to other types of networks and remote computer systems.

The computer 1000 may also include an input/output controller 1012 for receiving and processing input from one or more input devices, including a keyboard, a mouse, a touchpad, a touch-sensitive display, an electronic stylus, or other type of input device. Similarly, the input/output controller 1012 may provide output to a display device, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for locating relevant content items across multiple disparate content sources are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for locating content items in a plurality of content sources across different content servers, the system comprising:
   one or more processors;
   a memory coupled to the one or more processors; and
   an e-discovery client application residing in the memory and comprising computer-executable instructions that, when executed by the one or more processors, cause the system to:
      receive query parameters to define a query associated with a source specification of a pre-established case dataset, the source specification identifying a remote content source containing searchable content items;
      save the query as a query specification in the pre-established case dataset;
      execute the query of the saved query specification including applying the query against the searchable content items in the remote content source that is identified within the saved query specification by the source specification associated with the query;
      receive data regarding content items located through application of the query;
      aggregate query statistics based on the received data; and
      present the query statistics.

2. The system of claim 1, wherein the e-discovery client application comprises further computer-executable instructions that cause the system to:
- present a filter category along with one or more values for the filter category in the user interface based on the received data;
- receive a selection of one of the one or more values for the filter category;
- modify the query parameters to include a filter category/value pair based on the selection; and
- re-execute the query of the retrieved query specification based on the modified query parameters.

3. The system of claim 2, wherein the filter category is specific to a type of content items being searched in the remote content source.

4. The system of claim 1, wherein the remote content source identified by a first source specification comprises an email server and the remote content source identified by a second source specification comprises a content site server.

5. A computer-implemented method for locating content items in a plurality of content sources across different content servers, the method comprising:
- receiving from a user query parameters to define a query associated with a source specification of a pre-established case dataset, the source specification identifying a remote content source containing searchable content items;
- saving the query as a query specification in the pre-established case dataset;
- executing the query of the saved query specification including applying the query against the searchable content items in the remote content source that is identified within the saved query specification by the source specification associated with the query;
- receiving data regarding content items located through application of the query;
- aggregating query statistics based on the received data; and
- presenting the query statistics to the user.

6. The computer-implemented method of claim 5, wherein query statistics are presented regarding each content source defined by the source specification associated with the query.

7. The computer-implemented method of claim 6, wherein query statistics regarding each content source are grouped together by content source type.

8. The computer-implemented method of claim 5, further comprising segmenting the query, wherein query statistics are presented regarding each of a plurality of query phrases segmented from the query.

9. The computer-implemented method of claim 8, wherein the plurality of query phrases are segmented from the query at each explicit or implied OR junction.

10. The computer-implemented method of claim 5, further comprising: presenting a preview of one or more content items matching the query to the user from the received data.

11. The computer-implemented method of claim 10, wherein the preview of the one or more content items is presented for content items from content sources of a same type.

12. The computer-implemented method of claim 5, further comprising:
- receiving from the user a modification of the query parameters of the saved query;
- executing the modified query;
- receiving data regarding the content items located through application of the modified query against searchable contents items; and
- upon receiving the data, updating the query statistics presented to the user.

13. The computer-implemented method of claim 5, further comprising:
- presenting a filter category along with one or more values for the filter category to the user based on the received data;
- receiving a selection of one of the one or more values for the filter category from the user;
- modifying the query parameters to include a filter category/value pair based on the selection;
- saving the modified query as a retrievable modified query specification;
- retrieving the modified query specification and executing the modified query specification;
- receiving data regarding the content items located through application of the modified query; and
- upon receiving the data, updating the query statistics presented to the user.

14. The computer-implemented method of claim 5, wherein the remote content source identified by a first source specification comprises an email server and the remote content source identified by a second source specification comprises a content site server.

15. The computer-implemented method of claim 5, further comprising defining a plurality of the source specifications as a content collection within the pre-established case dataset.

16. The computer-implemented method of claim 15, further comprising applying a filter to the content collection prior to executing the query.

17. A computer-readable storage device encoded with computer executable instructions that, when executed by a computer, cause the computer to:
- receive query parameters defining a query that is associated with a source specification of a pre-established case dataset for e-discovery, the source specification identifying a plurality of remote content sources containing searchable content items, the query parameters comprising a free-text query;
- save the query as a query specification in the pre-established case dataset;
- execute the query of the saved query specification including applying the query against the searchable content items in the content source that is identified within the query specification by the source specification associated with the query;
- receive data regarding content items matching the query parameters found during execution of the query;
- aggregate query statistics based on the received data; and
- present the query statistics.

18. The computer-readable storage device of claim 17, wherein the instructions further cause the computer to present a preview of one or more content items matching the query for content items from content sources of a same type.

19. The computer-readable storage device of claim 17, wherein the query phrases are grouped into query phrases, the query phrases being segmented from the free-text-query at each explicit or implied OR junction between query phrases.

20. The computer-readable storage device of claim 17, wherein a first of the at least two content servers comprises an email server and a second of the at least two content servers comprises a file server.

* * * * *